Nov. 29, 1960   G. W. WRIGHT ET AL   2,962,035
IMPACT AND TEMPERATURE RESPONSIVE VALVE
Filed May 7, 1958   2 Sheets-Sheet 1

GEORGE W. WRIGHT
BURDETTE W. FOSS
JOHN C. KERR
         INVENTOR.

BY Edmund W. E. Kamm
         ATTORNEY

GEORGE W. WRIGHT
BURDETTE W. FOSS
JOHN C. KERR
*INVENTOR.*

BY Edmund W. C. Kamm
ATTORNEY

United States Patent Office 2,962,035
Patented Nov. 29, 1960

2,962,035

IMPACT AND TEMPERATURE RESPONSIVE VALVE

George W. Wright, Yoder, and John C. Kerr and Burdette W. Foss, Fort Wayne, Ind., assignors to Tokheim Corporation, Fort Wayne, Ind., a corporation of Indiana Filed May 7, 1958, Ser. No. 733,725

12 Claims. (Cl. 137—39)

This invention relates to an impact and temperature responsive valve. More specifically it relates to a valve, disposed in a flow line, which is held open so long as the valve is not subjected to severe shock, fracture or elevated temperature but which will close when it is subjected to such conditions.

The valve has particular application to fuel dispensing systems in which one or more dispensers are connected to a remotely located pump by suitable piping which is under pressure when the pump is in operation.

The pump may be started by closing a switch on the dispenser and, in the case of a multiple dispenser system, by a switch on any of the pedestals. Should the dispenser being operated or any of the dispensers in the system suffer a collision impact or be exposed to heat from a fire, the valve of the dispenser so affected will close and will prevent the flow of fuel through the pipe supplying fuel to the dispenser. Loss of fuel which would create a fire hazard or which would feed a fire, if one were already in progress, is thus prevented.

This application is a continuation in part of our prior application Serial Number 620,381 filed November 5, 1956, now Patent No. 2,910,080, for Impact Responsive Valve, and represents the addition of a thermally responsive mechanism for closing the valve disclosed in said prior application. The impact and fracture responsive features of the valve disclosed in said application are retained.

It is therefore an object of the invention to provide a valve for a flow line which is normally open but which will close when the valve is subjected to impact, fracture or elevated temperatures.

A further object is to provide a mechanism which may be added to an impact responsive valve to render it also responsive to elevated temperatures.

These and other objects will become apparent from a study of this specification and the drawings which are attached hereto, made a part hereof and in which Figure 1 is an elevation of the valve, partially in section.

Figure 3 is an elevation of the valve viewed from the right of Figure 1.

Figure 1:
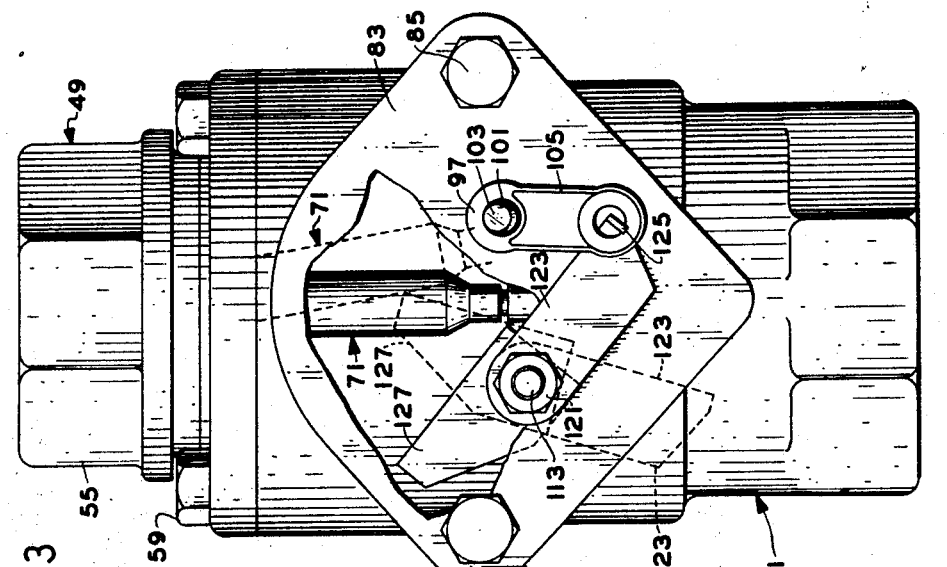

Referring first to Figure 1, the numeral 1 indicates the valve body which is provided with an internally threaded inlet 3 leading to a valve chamber 5. A radially, inwardly directed flange 7 of the body defines a passage 9 which communicates with the central or interponent chamber 11 having a bore 13 at its upper end, coaxial with the inlet, and a lateral bore 15 disposed at one side.

The flange 7, on the side adjacent chamber 11, is provided with a bore 17 and a shallow counterbore 19 to form supporting surfaces for an O-ring gasket 23 and a valve retaining ring 21 respectively.

A unitary valve assembly indicated generally by numeral 25 comprises a valve seat thimble or member 27 having a radial flange 29 adapted to rest upon the O-ring 23, a valve stem guide and spring seat 31 which nests in the top of the member 27, a valve stem 33 which slides through the guide, carries a spring seat 35 intermediate its ends, and carries a valve 37 at its lower end. The upper end of the stem has a flat surface 34 disposed normally to the axis of the stem. A helical compression spring 39 is disposed around the stem and has its ends bearing on said seats 31 and 35.

The retainer ring 21 is drawn down on the body by suitable screws 43 which enter the body from chamber 11 and since the ring overlaps flange 29 of the thimble 27, it serves to depress the latter so as to compress the O-ring 23 to seal the joint.

Bore 13 is counterbored at 45 to form a recess for the O-ring gasket 47.

A cover or plug 49 has an axial pilot boss 51 which fits in the bore 13 to complete the valve casing, has a radial flange 53 which extends outwardly over the counterbore 45 and has an axially upwardly directed discharge boss 55 which defines an internally threaded outlet 57. The cover is held in place on the upper end of body 1 by screws 59 which, when drawn down, cause flange 53 to compress gasket 47 to seal the joint.

The plug is bored at 61 on the side adjacent chamber 11 and has a counterbore 63 in which are seated a pair of spiders 65, 67 which have their central portions cupped in opposite directions to form a spherical socket 69.

A weighted pendant or interponent 71 has a ball journal 73 at its upper end which is received in the socket 69. The central portion 75 of the pendant is enlarged in diameter so as to increase the weight and consequently the inertia of the pendant. The lower end of the interponent is provided with an axially extending boss 78 of less diameter than the end 77 and the end surface 80 of the boss is flat and is disposed normal to the axis of the interponent.

The outline of the enlarged portion 75 of the interponent is joined with that of the portion 77 by a conical section 79 so that the valve stem cannot be caught on the interponent and be held thereby in a partially open condition when it should be closed.

In the normal, open condition of the valve, the surfaces 34 and 80 are parallel and are held in intimate contact by the valve spring as shown in Figure 1.

The lateral bore 15 terminates in a planar surface 81 on the exterior of body 1 and a cap 83 fits on said surface and is held in place thereon by screws 85. The cap is provided with a groove 87 which encircles the opening 15 and receives an O-ring gasket 89 which is held compressed between the bottom of groove 87 and surface 81 by screws 85 so as to seal the joint.

It will be noted from Figure 1 that plug 49 is encircled by a U-shaped groove 91 which substantially reduces the wall thickness of the plug on a line below the counterbore 63 and the spiders 65, 67. The strength of the plug at this section is less than that of any other portion of the plug or body and less than that of the pipes which are connected to the body. Thus any impact transmitted to the plug or any radical displacement of any element connected with the plug which would be severe enough ordinarily to rupture the line will cause the plug to fracture along the groove substantially before such strains can be applied to the connected elements thus preventing the rupture which might otherwise occur.

Figure 2:
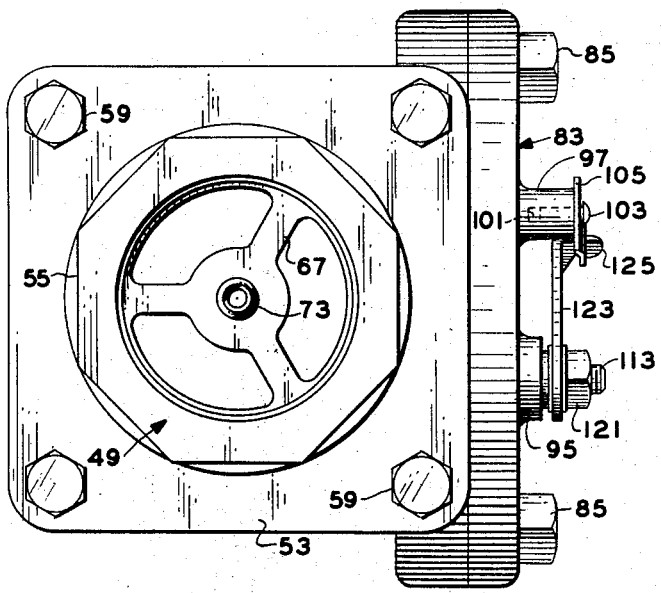
Figure 2 is a top plan view of the structure of Figure 1.

The cap 83 is provided with a pair of external bosses 95 and 97 and a stepped internal boss 99 which is substantially aligned with boss 95. Boss 97 is provided with a blind hole 101 which is adapted to receive a headed drive pin 103 which is adapted to support one end of a fusible link 105 as shown in Figures 2 and 3.

The bosses 95 and 99 are provided with a bore 107 which rotatably receives shaft 113 and with counterbore 111. An O-ring 115 is disposed on the shaft 113 within counterbore 111 and a bushing or bearing 117 is also fitted into the counterbore 111 and rotatably receives the shaft 113.

The outer end of the shaft is threaded and receives a washer 119 and nut 121 which serve to clamp a lever 123 on the shaft. The threaded end of the shaft is preferably provided with flats which enter a hole in the lever of similar outline so that the shaft and lever will rotate in unison.

The free end of the lever is provided with an outwardly bent projection 125 which is normally hooked in the other end of the fusible link 105.

As shown in Figure 1, the inner end of the shaft 113 has pinned to it a hammer or lever 127 which is bent so that its free end extends inwardly and beyond the interponent 71. A left hand, helical spring 129 is wound about the boss 99, has one end anchored on the cap 83 and the other end anchored on the lever 127. The spring is held under tension by the action of the fusible link acting through lever 123, shaft 113 and lever 127.

*Operation*

While the valve disclosed herein has a number of applications, it is particularly useful in fuel dispensing systems, such as are used in automobile filling stations, in which a pump is submerged in a tank or is otherwise located remotely from the dispensing pedestals and in which a number of pedestals, each having its individual switch to start and stop the pump, are connected by branch pipes to the main pump discharge line. Such a system is disclosed in the patent to G. W. Wright et al. No. 2,732,103 issued January 24, 1956.

The valve is installed in each branch line just below the pedestal and has its outlet connected, usually by a nipple and separable union, to the pedestal.

In the case of such a system which does not employ the valves described above it is quite possible that while the service station attendant may have started the pump and may be delivering fuel to a customer from one pedestal, another pedestal which is also under pressure from the same pump and which may even be out of sight of the operator, may be rammed by a car or other vehicle being operated in the service area. Should the collision be of sufficient force to spring leaks in the piping or connections or should it be severe enough to fracture or rupture them, the fuel would flow from the openings resulting from the collision and spread out over the surrounding area creating a serious fire hazard. At the same time the operator might be entirely unaware of what has occurred and allow the pump to continue in operation thus aggravating the situation.

To prevent such an occurrence, the branch pipe leading to each pedestal may be connected to the inlet 3 of the valve disclosed herein, at about the level of the island, while the outlet 57 is connected to the inlet pipe of the dispenser as explained above. Before the system is operated the cover 83 will be removed by removing screws 85, valve stem 33 will be depressed either with a finger or tool until the interponent 71, which swings freely in the spherical bearing 69, assumes the position of Figure 1 with respect to the valve stem 33. Upon release of the stem, the spring 39 will raise the stem until the face 34 on the upper end of stem 33 is in contact with the face 80 of boss 78. The interponent should be moved, if necessary, to secure parallel, face to face contact between the surfaces. The valve 37 will thus be held open but will be continually urged toward closed position by the spring 39 and also by any liquid which may flow through the body in a normal manner.

The lever 123 mounted on the cap should be rotated counterclockwise to the full line position (Fig. 3) to cock spring 129 and a fusible link 105 should be hooked between the pin 103 and projection 125 on the lever. The link will thus hold the spring cocked and the lever 127 away from the interponent 71 when the cap is mounted on the body.

The cap may then be replaced and the screws when drawn up render the seal 89 effective. The pedestal is then ready for operation.

Obviously the branch pipes of all of the pedestals should be equipped with the valve to obtain full benefits therefrom.

Under ordinary vibration such as that caused by vehicular traffic and operation of the pedestal and under impacts of minor magnitude, the frictional resistance of the contacting surfaces 34 and 80 will exceed the forces tending to cause relative lateral displacement of the interponent and the valve stem so that the valve will be held open under ordinary operating conditions.

Should a relatively severe shock or impact be imparted to the pedestal or to the piping, the device will respond thereto in one of two ways.

Should the blow be of sufficient magnitude to cause the inertia force of the interponent to exceed the frictional force between surfaces 34 and 80, the valve stem will be displaced relative to the interponent so that the valve will be released, whereupon the spring 39 will close the valve 37 on its seat, aided by any liquid flow through the body.

In the event the blow is of a magnitude sufficient to cause or threaten to cause a rupture in any part of the piping or valve, connecting the pedestal with the branch pipe, fracture will occur at the weakened section 91 of plug 49 before the full force of the blow can be applied to the rest of the piping. In this case the supporting spiders 65, 67 will be displaced along with the top portion of the plug, above the weakened section and this makes doubly certain that the interponent will be displaced to free the valve for closure.

It should also be noted that even though one branch from the discharge line may be closed as described above, the outlet is sealed off so that the other pedestals connected in the system may still be used. Unless such valves are installed in the branches, the rupture of one branch prevents the operation of all of the pedestals connected in the system.

If the emergency is caused by a fire in the immediate vicinity of a dispenser which is being operated, it often occurs that the dispensing hose is burned off or the visigage glass is broken by the flames. If the operator has neglected to shut down the pump, fuel will continue to be pumped into the fire.

However, if the dispenser is fitted with the valve disclosed herein, the heat of the fire will melt the fusible material of the link 105 which will part and free lever 123. Spring 129 will then rotate levers 123 and 127 (Fig. 3) clockwise and the end of lever 127 will sweep the interponent from its normal position over the valve stem 33. When the valve 37 is thus freed from the restraining action of the interponent, its spring 39 will close the valve and prevent further flow of fuel to the dispenser.

The O-ring gasket 115 prevents fuel from leaking out of the valve during normal operation.

In order to replace a broken plug, it is necessary merely to remove the screws 59, uncouple the union usually provided above the valve, unscrew the upper part of the plug from the nipple and withdraw the lower part of the plug and the interponent from the body 1. After a new plug fitted with an interponent has been screwed on the nipple and placed in position in the bore 13, it is necessary merely to insert the screws and remake the union.

If care has been exercised in replacing the plug, the interponent will have opened the valve and the unit will be ready to use. If this is not the case, a few additional minutes may be required to reset the valve by removing cap 83 as described above.

Even in the latter case, the time required to effect the repair is enormously less than that required to repair an outlet in which the branch line has broken off below the ground level. Such rupture usually occurs at the threads used to connect the branch line with the main discharge pipe and the removal of the broken off end presents an arduous task.

In the event the valve has been closed by the action of the lever or hammer 127 in response to the destruction of the fusible link, it is necessary to remove cap 83, reset the interponent on the valve stem as described above, restore the lever 123 to the full line position (Fig. 3) and install a new link 105. Thereafter the cap 83 may be again installed on the body 1 and the structure is conditioned to permit normal operation of the dispenser.

In the event it should be desired to replace the valve assembly 25 or gasket 23, this can be done relatively quickly by removing the plug as described above and, in addition, removing screws 43 and retainer 21 after which the entire valve assembly may be lifted out of the body as may the gasket 23 and new ones may be substituted, after which the parts may be reassembled. No screwed pipe connections need be disturbed to make the change and only the tools usually carried by a service mechanic are required to perform the task.

It should be noted that by altering the diameter of boss 78 of the interponent, the magnitude of the shock or impact which the valve will sustain before it trips may be changed.

A study of Figure 1 will disclose the fact that in order for the boss 78 to move off from the face of the valve stem, one edge of the boss must traverse the face of the stem. Since the distance from the center of the journal 73 to the center of the face of the boss is shorter than that to the edge of the boss, in order for the boss to clear the stem it must depress the stem slightly against the action of the spring 39. The greater the diameter of the boss the greater will be the movement of the valve required to free the boss and accordingly, the greater the magnitude of the shock or impact required to free the valve from the interponent.

Conversely, the smaller the diameter of the boss, the more sensitive the device becomes.

The sensitivity of the device may also be varied by varying the strength of the spring 39 or by a combination of changes in both the size of the boss and the strength of the spring. Thus the sensitivity of the mechanism can be rather finely controlled to suit the requirements of any installation.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:

1. An impact and temperature responsive valve mechanism comprising a body defining a chamber having an inlet and an outlet, a valve seat surrounding said inlet and disposed exteriorly of said chamber, a valve mounted exteriorly of said chamber for movement from and toward said seat to open and close said inlet, yieldable means for urging said valve closed, an elongated, weighted pendant, universal bearing means on said body and on one end of said pendant for suspending said pendant normally in a substantially vertical position in said chamber, means including said pendant, when it occupies said vertical position, for holding said valve open, a hammer, means mounting said hammer in said chamber for movement between normal and actuated positions in a path which intersects said pendant when the latter occupies its normal position, said hammer, upon passage to its actuated position, serving to displace said pendant from its vertical position to disable said valve holding means, yieldable means for urging said hammer toward its actuated position and means, including a temperature responsive element, for releasably holding said hammer in said normal position.

2. The structure defined by claim 1 wherein said temperature responsive element is a fusible link.

3. The structure defined by claim 1 wherein said hammer, in its normal position, is separated from said pendant, when it occupies its vertical position, so as to permit movement of said pendant away from its vertical position a distance sufficient to free said valve in response to impact applied to said valve in any direction.

4. The structure defined by claim 1 wherein said body includes an outlet boss disposed at the top of said body and which defines said outlet, a fracture groove intermediate the chamber and the end of the boss and wherein said boss defines means, disposed intermediate said groove and the end of the boss for supporting said bearing means, so as to disable said valve holding means when said boss is displaced from said body after fracture along said groove.

5. The structure defined by claim 1 whrein said body defines an opening in said chamber at one side of said pendant, and said hammer mounting means includes a closure for said opening, means for removably mounting said closure on said body, said yieldable means for said hammer and said temperature responsive means being also mounted on said closure and removable from the body therewith.

6. An impact and temperature responsive valve mechanism comprising a body defining a chamber having an inlet and an outlet, a valve seat surrounding said inlet and disposed exteriorly of said chamber, a valve mounted exteriorly of said chamber for movement from and toward said seat to open and close said inlet, yieldable means for urging said valve closed, an elongated, weighted pendant, universal bearing means on said body and one end of said pendant for suspending said pendant normally in a substantially vertical position in said chamber, means including said pendant, when it occupies said vertical position, for holding said valve open, a shaft, means for rotatably mounting said shaft on said body so as to extend from said chamber to the exterior of said body, a hammer mounted on the shaft within said chamber, and for rotation therewith between normal and actuated positions, in a path which intersects said pendant when the latter occupies its vertical position, said hammer, upon passage to its actuated position, serving to displace said pendant from its vertical position to disable said valve holding means, yieldable means for urging said hammer toward its actuated position, a temperature responsive element and means, including a lever mounted on the outer end of said shaft, connected with said temperature responsive element, for releasably holding said hammer in said normal position, said element being constructed so as to release said lever when said element attains a predetermined minimum temperature.

7. The structure defined by claim 6 wherein said temperature responsive element comprises a fusible link having one end connected to said lever and its other end supported in fixed relation to said body.

8. An impact and temperature responsive valve mechanism comprising a body defining a chamber having an inlet and an outlet, a valve seat surrounding said inlet and disposed exteriorly of said chamber, a valve mounted exteriorly of said chamber for movement from and toward said seat to open and close said inlet, yieldable means for urging said valve closed, an elongated, weighted pendant, universal bearing means on said body and one end of said pendant for suspending said pendant normally in a substantially vertical position in said chamber, means including said pendant, when it occupies said vertical position, for holding said valve open, said body defining a lateral opening for said chamber, a cap removably mounted on said body to close said opening, a hammer, means mounting said hammer on said cap and in said chamber, for movement between normal and actuated positions in a path which intersects said pendant when the latter occupies its normal position, said hammer, upon passage to its actuated position, serving to displace said pendant from its vertical position to disable said valve holding means, yieldable means mounted on said cap and hammer for urging said hammer toward its actuated position and means, including a temperature responsive element mounted on said cap, for holding said hammer in said normal position and for releasing said hammer when said element attains a predetermined minimum temperature.

9. The structure defined by claim 8 in which said temperature responsive element comprises a fusible link, and said hammer holding means includes means for connecting one end of said link with said hammer and means for anchoring the other end of said link on said cap.

10. The structure defined by claim 8 wherein said body includes a vertical boss which defines said outlet and a fracture groove which is disposed intermediate the chamber and the outlet end of the boss, means disposed in said outlet between said groove and the end of the boss for supporting said bearing means so as to disable said valve holding means when said boss is displaced from said body after fracture at said groove.

11. The structure defined by claim 10 in which said boss is removably attached to said body so that it may be replaced after fracture.

12. The structure defined by claim 10 wherein said inlet is disposed opposite to said outlet, said valve includes a seat, a valve poppet and guide means for said poppet, formed as an integral unit, and said valve is sealingly mounted with respect to said inlet by means of a compressible gasket and removable fasteners.

References Cited in the file of this patent

UNITED STATES PATENTS

| | | |
|---|---|---|
| 704,529 | Foskett | July 15, 1902 |
| 1,712,498 | Hawxhurst | May 14, 1929 |
| 1,814,526 | Pickop | July 14, 1931 |
| 2,048,388 | Johnsen | July 21, 1936 |
| 2,236,958 | Mathisen | Apr. 1, 1941 |
| 2,255,965 | Brandon | Sept. 16, 1941 |
| 2,637,331 | Sullivan | May 5, 1953 |